Sept. 5, 1961  G. A. LYON  2,998,995
WHEEL STRUCTURE
Filed April 15, 1957  2 Sheets-Sheet 1
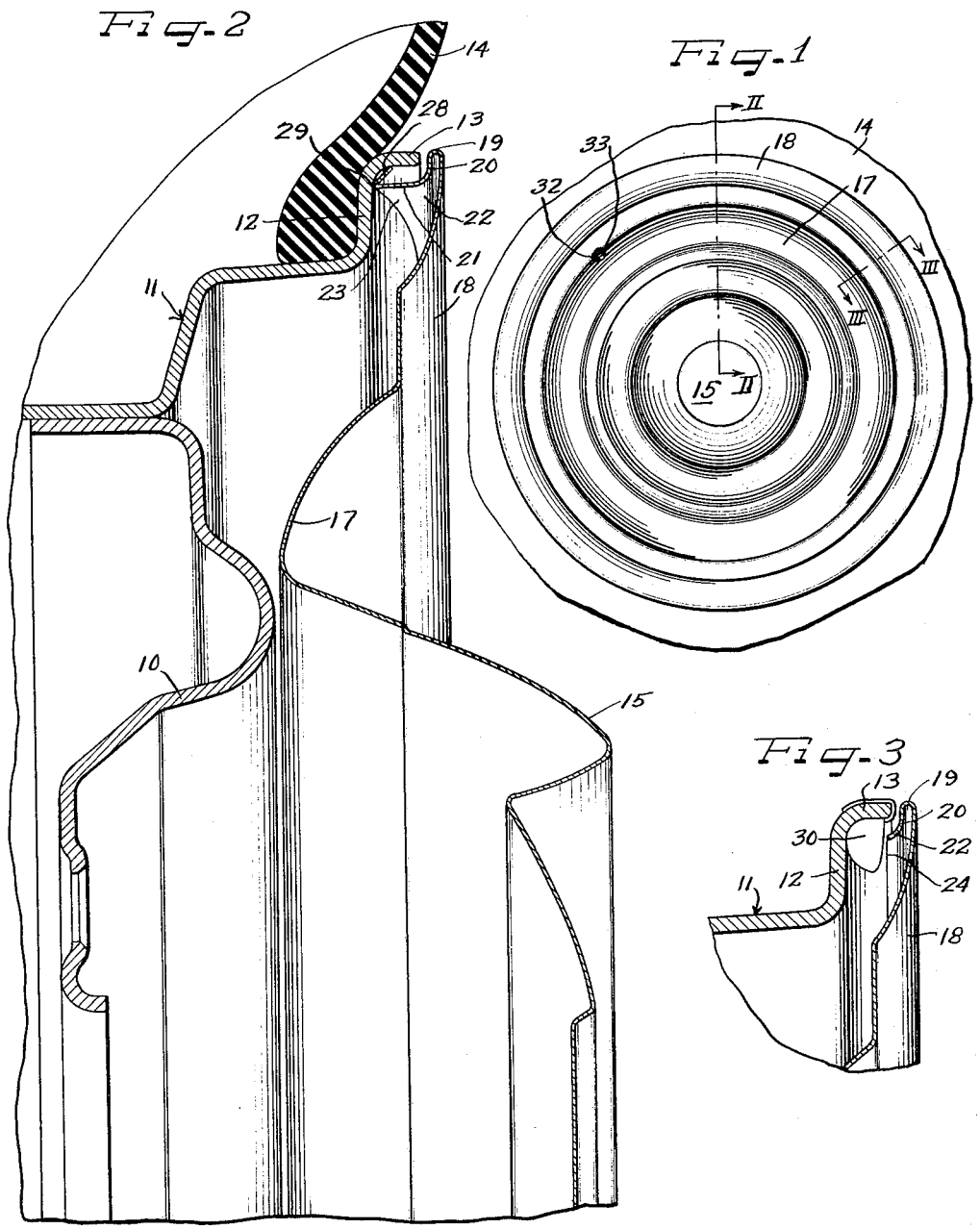
Inventor
GEORGE ALBERT LYON Sept. 5, 1961 G. A. LYON 2,998,995
WHEEL STRUCTURE
Filed April 15, 1957 2 Sheets-Sheet 2
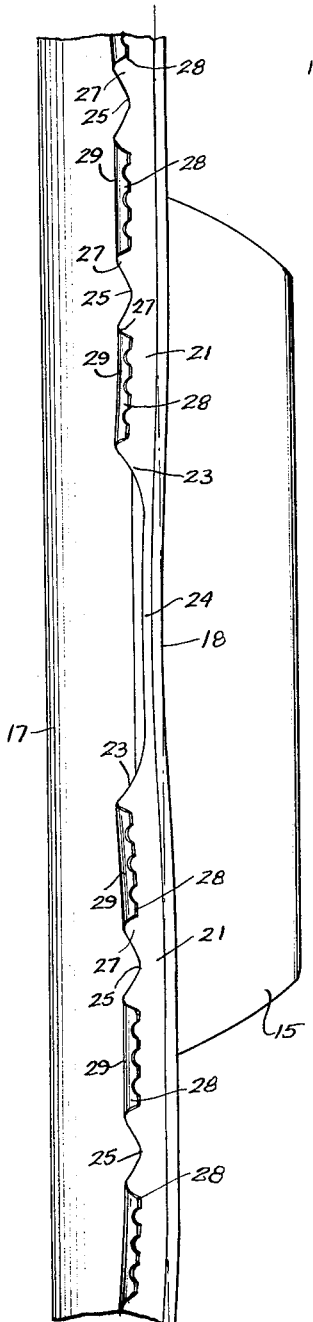
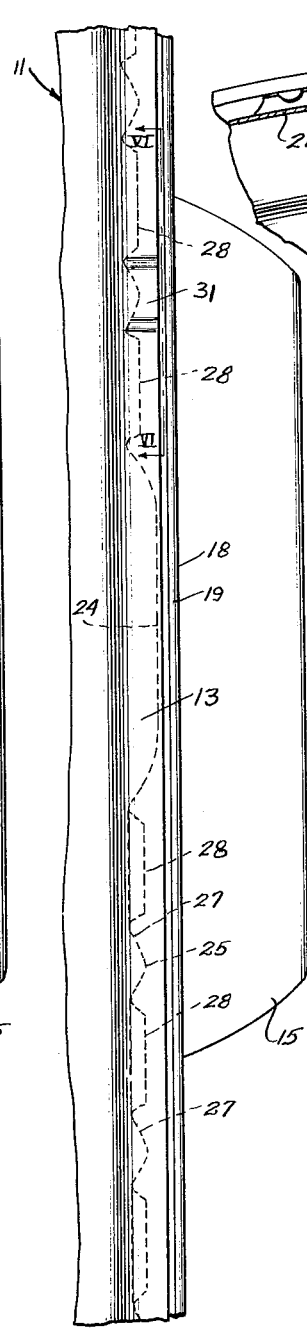
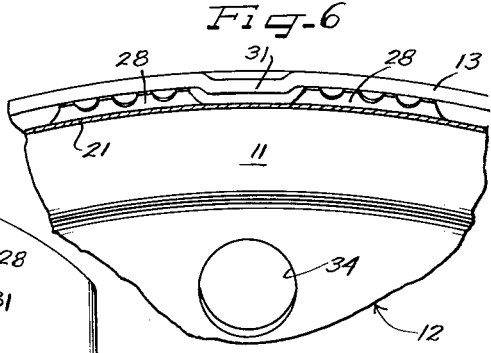
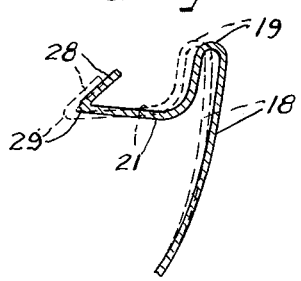
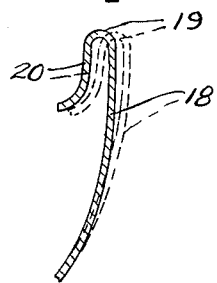
Inventor
GEORGE ALBERT LYON

United States Patent Office 2,998,995
Patented Sept. 5, 1961

2,998,995
WHEEL STRUCTURE
George Albert Lyon, 13881 W. Chicago Blvd.,
Detroit 28, Mich.
Filed Apr. 15, 1957, Ser. No. 652,768
4 Claims. (Cl. 301—37)

The present invention relates to improvements in wheel structures and more particularly concerns the ornamental and protective covering of the outer sides of vehicle wheels.

A problem encountered in securing wheel covers to the outer sides of vehicle wheels by retaining engagement of retaining fingers behind the margins of the covers with the terminal flange of the tire rim of the wheel arises from the standard manner of balancing wheels by the application of lead weights as may be desirable for dynamic balancing to the terminal flange with which the retaining fingers are engageable. For this purpose, adequate spacing must be afforded between the structure of the wheel cover between the retaining fingers in order to clear the weights. Since it is desirable to have the margin of the cover not project excessively axially outwardly beyond the terminal flange, it means that the flange structure behind the cover margin must be constructed with a view to affording such wheel balancing weight clearance. More particularly, the axially extending resiliency enhancing flange structure that desirably connects adjacent finger units for stiffening the fingers must be sacrificed. It is therefore necessary to compensate for the shortened or eliminated axial reinforcing or stiffening flange.

In view of high speeds and power in modern automobiles, it is also desirable to provide means for preventing turning of the covers on the wheel, so as to avoid distortion or misalignment of the valve stem that projects through the covers.

It is accordingly an important object of the present invention to provide an improved wheel structure wherein a cover is provided for disposition over the outer side of the wheel and having integral retaining fingers for retaining engagement with the terminal flange, with ample provision between the fingers for accommodating wheel balancing weights and such construction and arrangement of the cover margin with relation to the retaining fingers as to compensate for lack of or reduction in stiffening or connecting flange reinforcement between the fingers.

Another object of the invention is to provide an improved wheel cover having the margin thereof so related to cover retaining fingers carried by and behind the margin that the cover margin coacts with the fingers in affording resiliency stiffening effect in the applied, cover retaining coaction of the fingers with a rim flange.

A further object of the invention is to provide a wheel cover having a marginal structure providing cover retaining fingers therebehind, and with the marginal structure prewarped opposite to warping that occurs incident to resilient compression and flexure on the retaining fingers reflected in warpage of the cover margin which, due to the prewarping, effects substantial straightening of the margin in the assembled relationship of the cover on the wheel.

Still another object of the invention is to provide a novel wheel structure wherein a cover is applicable to the outer side of the wheel with retaining fingers engaging a substantially straight terminal flange provided with turn-preventing means cooperable with the retaining fingers of the cover for holding the cover against turning.

Other objects, features and advantages of the present invention will be readily apparent from the following detailed description of a preferred embodiment thereof taken in conjunction with the accompanying drawings wherein:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a fragmentary radial sectional detail view taken substantially on the line III—III of FIGURE 1;

FIGURE 4 is a fragmentary edge elevational view of the cover;

FIGURE 5 is a fragmentary elevational view of the terminal flange and the cover assembled therewith;

FIGURE 6 is a fragmentary sectional elevational detail view taken substantially on the line VI—VI of FIGURE 5;

FIGURE 7 is a schematic sectional detail view of the cover on a substantially enlarged scale and showing the relationship of the retaining fingers and the cover margin in the normal untensioned and the tensioned conditions thereof; and FIGURE 8 is an enlarged sectional detail view of the cover taken between a pair of fingers and showing such marginal portion as it appears in the untensioned condition of the cover and in the tensioned applied condition of the cover.

A wheel cover embodying features of the invention as shown in FIGURES 1, 2 and 3 is adapted to be applied to the outer side of a vehicle wheel including a wheel body 10 carrying a multi-flange drop center tire rim 11 provided with a terminal flange structure that includes a generally radially outwardly extending and axially outwardly facing portion 12 merging into a generally radially inwardly facing and axially outwardly extending substantially straight terminal flange lip or extremity portion 13. A pneumatic tire 14 is adapted to be carried by the tire rim 11.

Centrally the wheel cover includes a crown portion 15 for overlying the central portion of the wheel body 10 and merging with an intermediate inwardly dished annular portion 17 from which extends generally radially and axially outwardly a marginal annular portion 18 dimensioned to overlie the tire rim and more particularly the terminal flange 12, 13 thereof, with a turned edge or extremity 19 of substantially bead-like annular form providing a finishing and reinforcing edge of a diameter to substantially overlie the tip portion of the terminal flange lip 13. Extending radially inwardly from the turned edge 19 integrally in one piece therewith is a short annular return-bent generally radially inwardly extending underturned flange 20 of a width to extend radially inwardly a short distance beyond the inner face of the terminal flange lip 13.

For retaining the cover on the outer side of the wheel, the underturned marginal flange 20 is provided with a circumferentially spaced series of cover retaining fingers 21 in the form of generally axially inward integral extensions from the underturned flange 20 and joined thereto on a reinforcing, resiliency enhancing juncture rib 22. The fingers 21 may be four in number and of substantial width and thus circumferential curvature which taken together with the shortness of the fingers, affords substantial resilient stiffness for the fingers. In a practical construction, the fingers 21 are derived from four corner portions of a rectangular sheet metal blank such as stainless steel, brass or the like shaped by press drawing and cold working, and more particularly cold working of the cover margin 18 and the underturned flange 20 and the fingers 21 to impart substantial resilient stiffness thereto. In this instance, the retaining fingers 21 are not substantially longer than the length of the terminal flange lip portion 13. At their sides, the retaining fingers 21 have flaring side portions 23 joining the turned back flange 20 between adjacent fingers, with, in the present instance, an extremely limited turned reinforcing portion 24 (FIG. 3) extending from the terminus of the underturned flange 20 between the adjacent finger side portions 23. This narrow turned reinforcing portion 24, together with the reinforcing juncture rib-like formation 22 does afford a certain amount of resiliency enhancing connection between the retaining finger units 21, but only a very limited amount.

The axially inner end portions of the retaining finger units 21 are for substantially self-adjustment retaining engagement with the tire rim preferably sub-divided by shallow cut outs (FIG. 4) into short axial finger extension portions 27 provided with short and stiff generally radially and axially outwardly oblique notched edge retaining and gripping terminal flanges 28 joined on reinforcing and seating rib junctures 29 to the respective finger sections 27.

On the wheel, as shown in FIGURES 2 and 3, the retaining fingers 21 engage retainingly with the radially inner face of the straight terminal flange lip 13 and the juncture rib shoulders 29 bottom against the adjacent axially facing terminal flange portion 12 whereby to support the cover in completely spaced relation not only to the wheel body 10 but also to the tire rim 11 except for engagement of the retaining fingers with the terminal flange. In this retained engagement, the slight turned edge 24 of the underturned flange structure is maintained substantially clear of the terminal flange sufficiently to enable the accommodating of wheel balancing weights 30 on the terminal flange behind the cover margin as shown in FIGURE 3.

In order to compensate for the lack of mutual reinforcing and resiliency assuring axial flange connection between the retaining finger units 21, a prewarp is fashioned in the cover margin as more or less schematically shown in FIGURE 4. To this end, the cover margin 18 between the retaining finger units 21 is generally dished inwardly along a transverse axis while the portions of the cover margin aligned with the retaining finger units 21 are correspondingly humped or bowed axially outwardly in a shallow sinuous pattern symmetrically about the entire circumference of the cover. At the same time, the retaining finger units 21 are disposed initially on a diameter at their terminal portions somewhat greater than the wheel-attached diameter thereof, substantially as shown in FIGURE 7 in full line position. Then, when the retaining finger units 21 are resiliently deflected radially inwardly to smaller diameter by engagement of the retaining terminals 28 with the terminal flange portion 13 and radially inward deflection from larger diameter to the smaller diameter of such inner face of the terminal flange, there is a corresponding generally axially inward levering of the aligned portion of the cover margin 18 to the substantially dash outline position shown in FIGURE 7. At the same time, the dished-in intermediate marginal portions between the retaining fingers are buckled axially outwardly and are thus moved from substantially the full outline position in FIGURE 8 to the dash outline position. Since the prewarp of the cover margin 18 is symmetrical axially inwardly and axially outwardly, the warpage sectors balance out in the fully retained condition of the cover wherein all of the retaining fingers 21 are uniformly radially inwardly deflected, and the edge of the cover as viewed in edge elevation in FIGURE 5 assumes a substantially straight, uniform plane condition. Not only is this a desirable end condition from an appearance standpoint, but it also assures a substantial resilient reaction in the retaining fingers tending to maintain the same in radially outward thrusting relation to the terminal flange lip portion 13 so that the retaining terminals 28 of the retaining fingers maintain a firm retaining engagement with the terminal flange.

In order to hold the cover against turning on the wheel, the terminal flange lip portion 13 is provided as best seen in FIGURES 5 and 6, with a generally radially inwardly pressed projection 31 running out at the tip of the terminal flange and of a width to be received between a pair of adjacent retaining terminals 28 of preferably one of the retaining fingers 21 aligned with a valve stem aperture 32 in the dished cover portion 17 (FIG. 1) for registration therethrough of a valve stem 33 that is carried on the tire rim and projects from a valve stem aperture 34 in the rim (FIG. 6) aligned with the turn-preventing projection 31. By this arrangement of the turn-preventing projection 31, interference with sealing engagement of the pneumatic tire 14, which is of the tubeless type, is avoided.

In applying the cover to the outer side of the wheel, the valve stem aperture 32 is aligned with the valve stem 33 and at the same time the retaining finger terminals 28 of the aligned retaining finger 21 engage the terminal flange lip portion 13 on opposite sides of the anti-turn projection 31. Then the cover is pressed axially inwardly so that the remaining retaining fingers are engaged at their retaining terminals 28 against the tip of the terminal flange lip 13 and cammed axially inwardly as continuing axially inward pressure is applied to the cover until all of the retaining fingers are uniformly radially inwardly compressed and deflected and placed under retaining resilient tension, with concurrent leveling out of the prewarped cover marginal portion 18 from the sinuous full line condition shown in FIGURE 4 to substantially the dash line plane shown in FIGURE 4 and more particularly the assembled condition shown in FIGURE 5.

It will be understood that modifications and variations may be effected without departing from the scope of the novel concepts of the present invention.

I claim as my invention:

1. In a wheel structure including a tire rim having a radially inwardly facing flange, a cover for disposition at the outer side of the wheel including a margin for overlying the tire rim and especially said flange and having behind said margin a series of circumferentially spaced cover retaining fingers provided with terminals that project normally radially outwardly to a greater diameter than the inner face of said rim flange and engageable with said rim flange in gripping engagement accompanied by radially inward deflection of the fingers, the cover margin being resiliently flexibly deflectable in axial direction and having a prewarp therein normally providing an axially outward bowing of portions thereof aligned with the retaining fingers and axially inward bowing of the portions thereof between the retaining fingers, said prewarp being leveled out by axially inward drawing of the portions aligned with the fingers and axially outward deflection of the portions between the fingers incident to the radially inward deflection of the fingers in retained engagement with said rim flange.

2. In a wheel structure including a tire rim having a radially inwardly facing flange, a cover for disposition at the outer side of the wheel including a margin for overlying the tire rim and especially said flange and having behind said margin a series of circumferentially spaced cover retaining fingers provided with terminals that project normally radially outwardly to a greater diameter than the inner face of said rim flange and engageable with said rim flange in gripping engagement accompanied by radially inward deflection of the fingers, the cover margin being resiliently flexibly deflectable in axial direction and having a prewarp therein normally providing an axially outward bowing of portions thereof aligned with the retaining fingers and axially inward bowing of the portions thereof between the retaining fingers, said prewarp being leveled out by axially inward drawing of the portions aligned with the fingers and axially outward deflection of the portions between the fingers incident to the radially inward deflection of the fingers in retained engagement with said rim flange, said rim flange comprising a substantially straight terminal flange lip and said cover margin being dimensioned to overlie said lip.

3. In a wheel structure including a tire rim having a terminal flange provided with a radially outwardly extending and axially outwardly facing portion joining a generally axially outwardly extending and radially inwardly facing substantially straight lip portion of annular form, a cover for disposition at the outer side of the wheel including a circular cover member having a margin for overlying the terminal flange and provided with an underturned portion from which extends a circumferentially spaced series of generally axially inwardly extending retaining finger extensions spaced apart and at their sides joining said underturned flange portion, said fingers being of a length not substantially greater than the length of said terminal flange lip and having at their inner extremities cover retaining short and stiff radially and axially outwardly oblique terminals engageable in retaining gripping relation against the inner face of said flange lip with juncture shoulders between the fingers and said terminals bottoming against the radially extending terminal flange portion and maintaining the underturned flange between the retaining fingers in substantially spaced relation to the terminal flange so as to accommodate a wheel balancing weight mounted on the terminal flange behind the cover margin, said cover margin having a resiliently flexible prewarp construction wherein portions of the margin are normally symmetrically biased to project generally axially outwardly in alignment with the fingers and portions of the margin are biased to project generally axially inwardly between the fingers and by radially inward deflection of the fingers in engagement with said terminal flange lip effecting compensatory warpage whereby the outwardly biased portions are drawn generally axially inwardly and the inwardly biased portions are forced generally axially outwardly to afford a substantially straight edge on the cover in the assembled relationship thereof with the wheel.

4. In a cover for disposition at the outer side of a vehicle wheel, a circular cover member having a radially outer resiliently flexible marginal portion provided with an underturned narrow flange having at spaced circumferential intervals generally axially inwardly extending retaining finger extensions of substantial width and resilience for retaining engagement with a radially inwardly facing flange of a tire rim, said cover margin in alignment with the fingers having a substantially axially outward prewarp bowed form with corresponding axially inward compensatory prewarp bowed form between the retaining fingers, the retaining fingers normally extending radially outwardly to a greater diameter than the radially inner face of a rim flange and in assembly therewith being compressible to a smaller diameter wherein the prewarp axially outward portions are drawn generally axially inwardly and the prewarp axially inward portions are resiliently deflected generally axially outwardly to afford a substantially straight edge for the cover in assembly on a wheel.

References Cited in the file of this patent

UNITED STATES PATENTS

| 2,624,633 | Lyon | Jan. 6, 1953 |
| 2,624,634 | Lyon | Jan. 6, 1953 |
| 2,686,082 | Lyon | Aug. 10, 1954 |
| 2,690,357 | Lyon | Sept. 28, 1954 |
| 2,690,358 | Lyon | Sept. 28, 1954 |

FOREIGN PATENTS

| 718,346 | Great Britain | Nov. 10, 1954 |
| 509,850 | Canada | Feb. 8, 1955 |